US010455985B2

(12) United States Patent
Lee (10) Patent No.: US 10,455,985 B2
(45) Date of Patent: Oct. 29, 2019

(54) MIXING VESSEL

(71) Applicant: Wen-Ching Lee, Taichung (TW)

(72) Inventor: Wen-Ching Lee, Taichung (TW)

( * ) Notice: Subject to any disclaimer, the term of this patent is extended or adjusted under 35 U.S.C. 154(b) by 196 days.

(21) Appl. No.: 14/987,523

(22) Filed: Jan. 4, 2016

(65) Prior Publication Data

US 2016/0324369 A1    Nov. 10, 2016

(30) Foreign Application Priority Data

May 7, 2015    (CN) .......................... 2015 1 0228801

(51) Int. Cl.
*A47J 43/07*    (2006.01)
*A47J 43/046*    (2006.01)

(52) U.S. Cl.
CPC ......... *A47J 43/0727* (2013.01); *A47J 43/046* (2013.01); *A47J 43/0716* (2013.01)

(58) Field of Classification Search
CPC .. A47J 43/046; A47J 43/0716; A47J 43/0727; A47J 43/07
USPC .......... 99/509, 410, 473, 510, 511, 512, 513
See application file for complete search history.

(56) References Cited

U.S. PATENT DOCUMENTS

| | | | | | |
|---|---|---|---|---|---|
| 2,530,455 | A | * | 11/1950 | Fritz | A47J 43/046 241/282.1 |
| 3,139,917 | A | * | 7/1964 | Elmore | A47J 43/0722 241/191 |
| 4,462,694 | A | * | 7/1984 | Ernster | B01F 7/00008 241/282.2 |
| 5,533,852 | A | * | 7/1996 | Matthews | F16B 43/002 411/428 |
| 6,210,033 | B1 | * | 4/2001 | Karkos, Jr. | A23G 9/045 366/205 |
| 6,960,015 | B2 | * | 11/2005 | Lee | A47J 43/0722 366/205 |
| 2010/0014380 | A1 | * | 1/2010 | Kolar | A47J 43/0716 366/347 |
| 2014/0084094 | A1 | * | 3/2014 | Lee | A47J 43/046 241/101.3 |

FOREIGN PATENT DOCUMENTS

EP    2572614 A1 *  3/2013   ..........  A47J 43/0727

* cited by examiner

*Primary Examiner* — Dana Ross
*Assistant Examiner* — James F Sims, III
(74) *Attorney, Agent, or Firm* — Muncy, Geissler, Olds & Lowe, P.C.

(57) ABSTRACT

A mixing vessel includes a vessel body, a clamping device and a stirrer. The vessel body includes a bottom panel and a vessel wall upwardly extended from the border of the bottom panel. The bottom panel defines a top surface, an opposing bottom surface and an opening cut through the top surface and the bottom surface. The clamping device is connected to the bottom panel of the vessel body and clamped on the top surface and the bottom surface of the bottom panel. The stirrer is inserted through the opening of the bottom panel of the vessel body and connected to the clamping device. Thus, subject to fixation of the clamping device to the bottom panel of the vessel body, the mixing vessel presents the bottom panel of the vessel body from deformation due to heat.

9 Claims, 7 Drawing Sheets

MIXING VESSEL

BACKGROUND OF THE INVENTION

1. Field of the Invention

The present invention relates to a mixing vessel technology and more particularly, to a mixing vessel for juicer.

2. Description of the Related Art

Health care ethos has become increasingly popular in recent years. However, due to busy life, people often do not have enough time to cook a variety of ingredients, and therefore they are often unable to absorb enough nutrients in the diet. However, after creation of food processor, people can use a food processor to chop, grind and cook food ingredients into edible food. Therefore, a food processor can be a valuable time saving resource for any cook.

Except for chopping and grinding food ingredients, the vase of a food processor can be controlled to heat food ingredients in the mixing vessel of the food processor. However, because the mixing vessel of a conventional food processor is made from plastics, the bottom of the mixing vessel can easily be heated to deform during cooking, resulting in leaking of fluid food out of the mixing vessel.

In view of the drawback that the mixing vessel of a conventional food processor can easily be deformed by heat, there is a strong demand for improvement in this regard.

SUMMARY OF THE INVENTION

The present invention has been accomplished under the circumstances in view. It is therefore the main object of the present invention to provide a mixing vessel, which presents thermal deformation of component parts.

To achieve this and other objects of the present invention, a mixing vessel comprises a vessel body, a clamping device and a stirrer. The vessel body comprises a bottom panel and a vessel wall upwardly extended from the border of the bottom panel. The bottom panel comprises a top surface, an opposing bottom surface and an opening. The opening cuts through the top surface and bottom surface of the bottom panel. The clamping device is connected to the bottom panel of the vessel body and clamped on the top surface and bottom surface of the bottom panel. The stirrer is inserted through the opening of the bottom panel and connected to the clamping device. Thus, the mixing vessel uses the clamping device to secure the bottom panel of the vessel body, preventing deformation of the bottom panel of the vessel body due to heat.

Preferably, the clamping device comprises a pressure plate and a bottom block. The pressure plate is pressed on the top surface of the bottom panel of the vessel body. The bottom block supports the bottom surface of the bottom panel of the vessel body. The stirrer is connected with the bottom block to hold down the pressure plate. Thus, the bottom panel of the vessel body is held down by the pressure plate and the bottom block, avoiding deformation.

Other advantages and features of the present invention will be fully understood by reference to the following specification in conjunction with the accompanying drawings, in which like reference signs denote like components of structure.

DETAILED DESCRIPTION OF THE INVENTION

Figure 1:
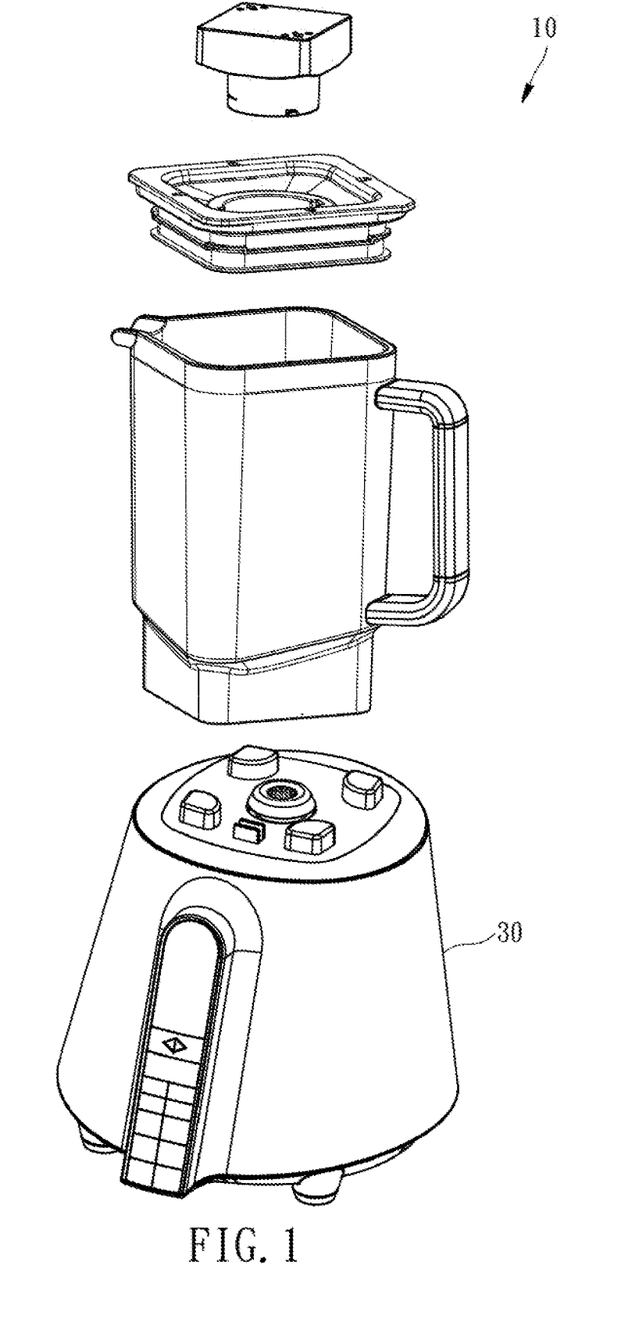
FIG. 1 is an exploded view of a food processor using a mixing vessel in accordance with the present invention.

Referring to FIG. 1, a mixing vessel 10 in accordance with the present invention is adapted for detachably mounting on a base 30 to create a food processor, juicer or mixing apparatus. The base 30 houses a motor, a controller and other related components. Further, the base 30 can be made in a variety of forms and is of the known art, therefore no further detailed description in this regard will be necessary.

Figure 2:
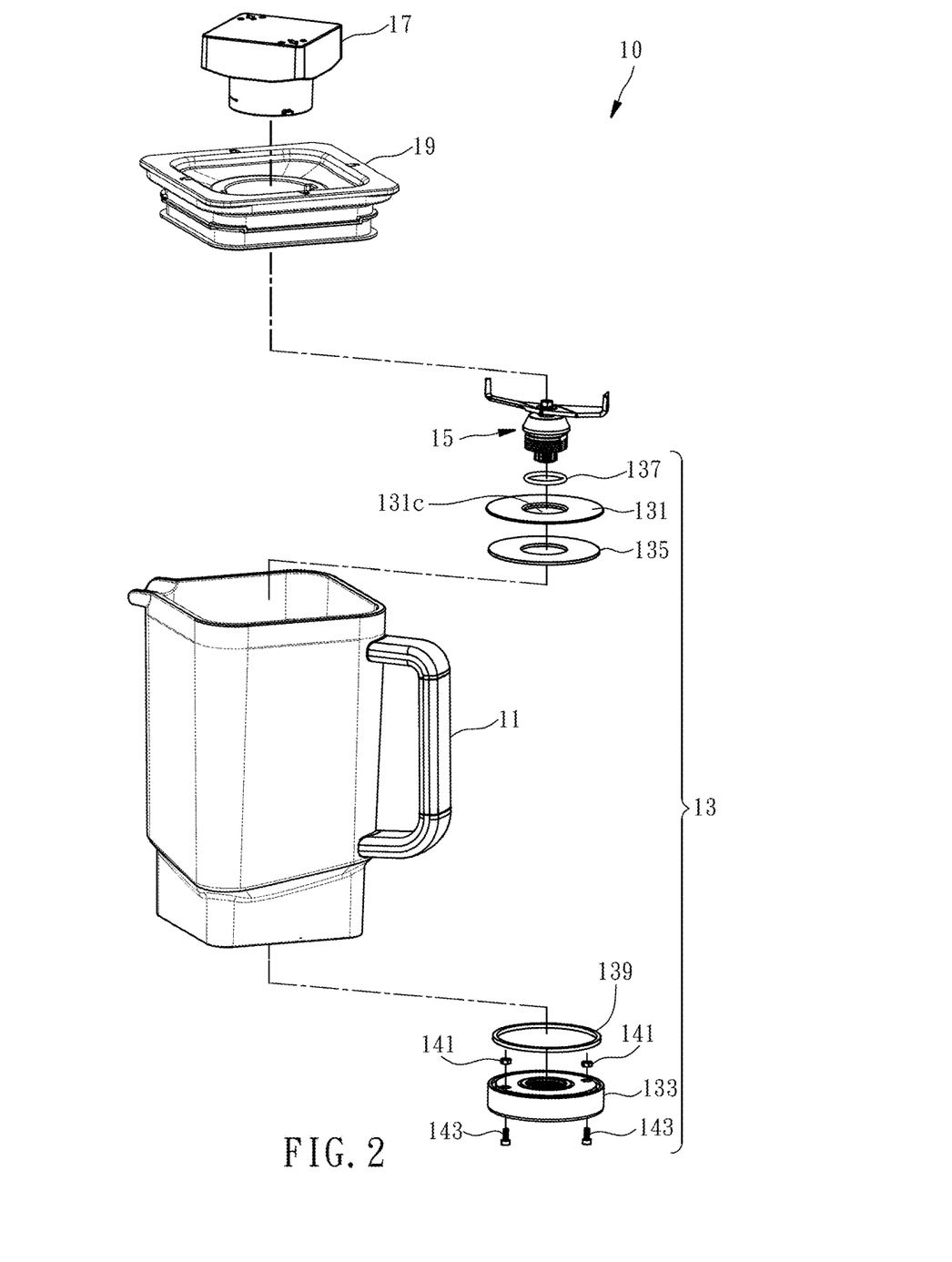
FIG. 2 is an exploded view of the mixing vessel in accordance with the present invention.

As illustrated in FIG. 2, the mixing vessel 10 comprises a vessel body 11, a clamping device 13, a stirrer device 15, a measuring cup 17 and a cup cover 19. The clamping device 13 and the stirrer device 15 are mounted in the vessel body 11. The measuring cup 17 is detachably mounted in the cup cover 19. Because the measuring cup 17 and the cup cover 19 are not within the scope of the features of the present invention, they are not described in detail.

In this embodiment, the clamping device 13 comprises a pressure plate 131, a bottom block 133, a waterproof gasket 135, a water seal ring 137, a shockproof gasket 139, and two fasteners each consisting of a screw nut 141 and a screw 143. The stirrer device 15 is a cutter set for cutting and stirring food in the vessel body 11. A top surface of the pressure plate 131 is an entire flat surface. The material of the pressure plate 131 is preferably, but not limited to, stainless steel.

Figure 3:
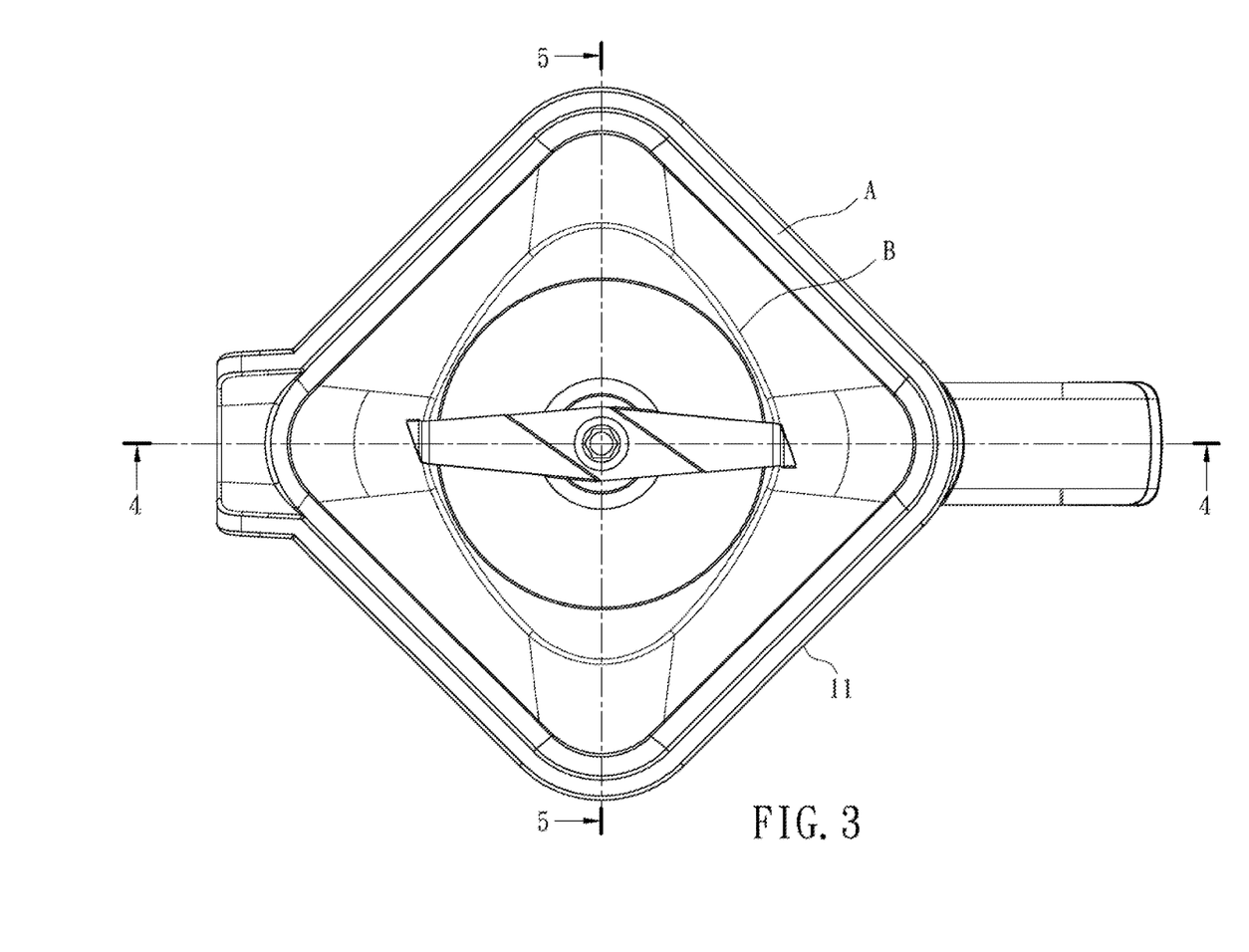
FIG. 3 is a top view of the mixing vessel in accordance with the present invention.

As illustrated in FIG. 3, the vessel body 11 in this embodiment has a rectangular outer contour A. The contour B of the vessel body 11 exhibits a rhombic shape. This vessel body configuration design is helpful for improving the effect of mixing of food in the vessel body 11, however, in actual application, the vessel body 11 can be configured to exhibit any other shape without restriction.

Figure 4:
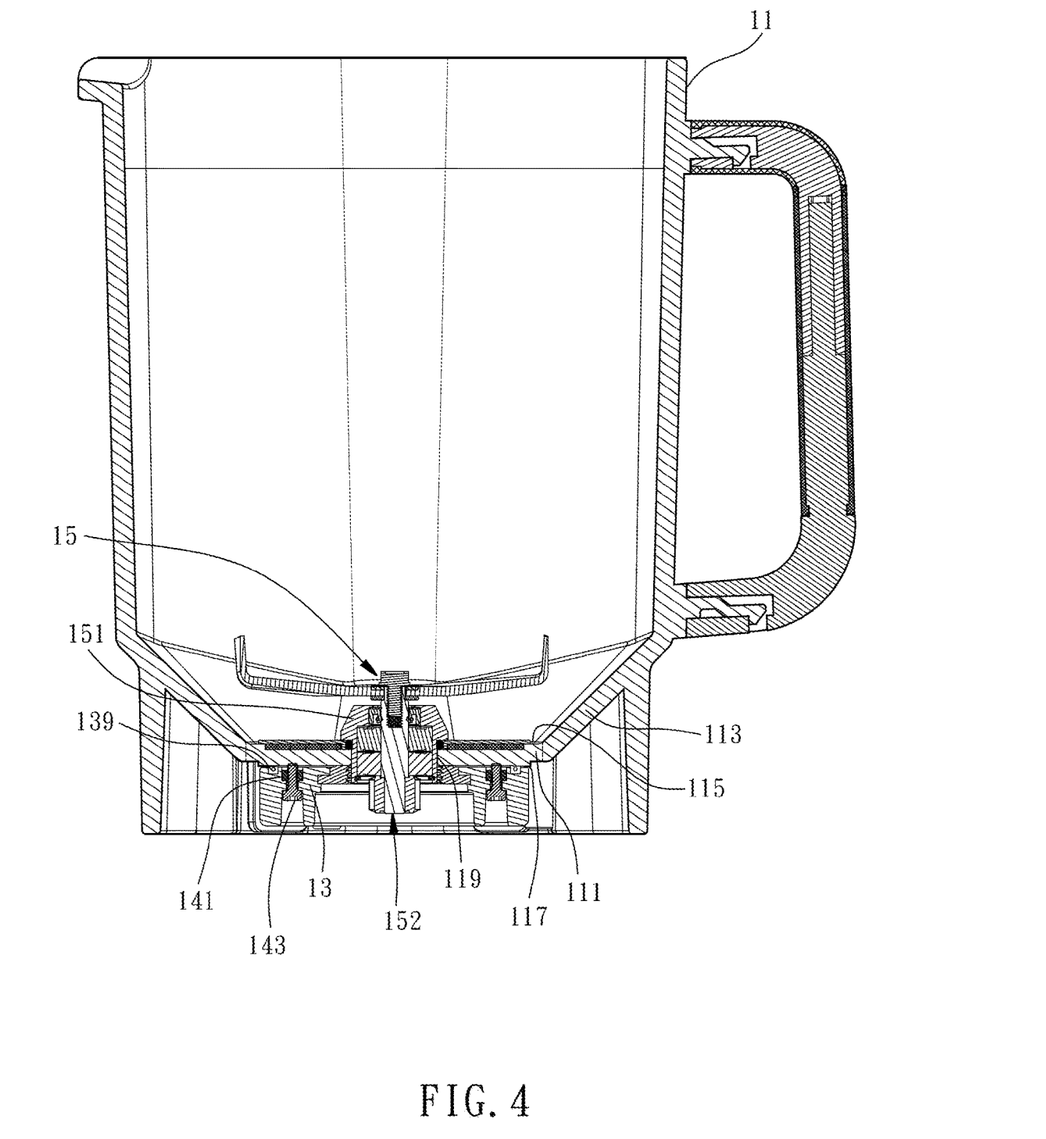
FIG. 4 is a sectional view taken along line 4-4 of FIG. 3.
Figure 5:
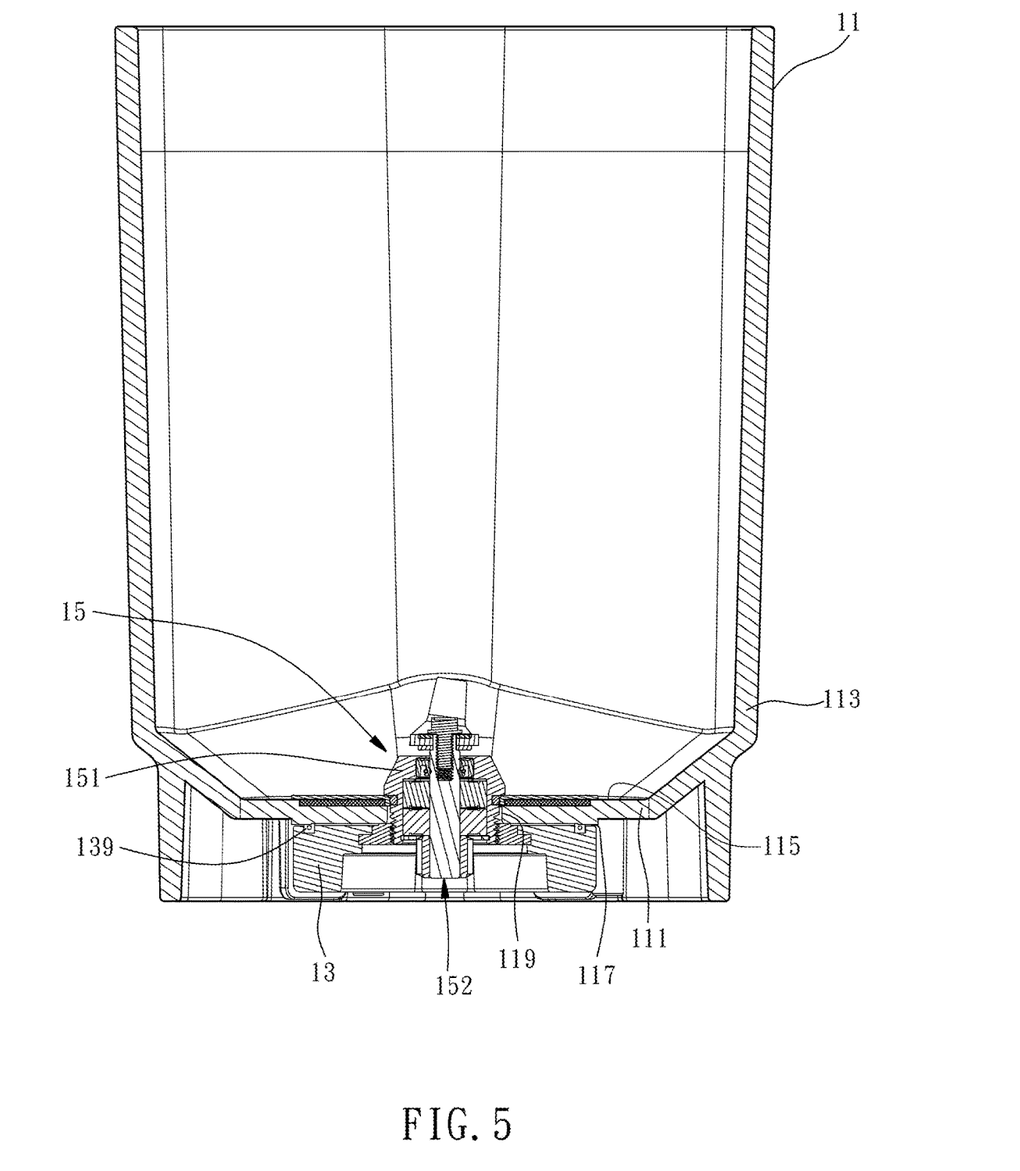
FIG. 5 is a sectional view taken along line 5-5 of FIG. 3.

As illustrated in FIG. 4 and FIG. 5, the vessel body 11 comprises a bottom panel 111 and a vessel wall 113 upwardly extended from the border of the bottom panel 111. For easy understanding of the location of the bottom panel 111 and the location of the vessel wall 113, an imaginary line is illustrated to divide them, actually, this imaginary line does not exist. Further, the upwardly extending vessel wall 113 is not limited to the illustrated tilt angle, therefore, the design of the vessel wall 113 of the vessel body 11 of the present preferred embodiment is not a limitation. In this embodiment, the contour of the bottom panel 111 exhibits a rhombic shape. Because the bottom panel 111 is the bottom of the vessel body 11 in this embodiment, the contour of the bottom panel 111 is the aforesaid contour B.

The bottom panel 111 comprises a top surface 115, a bottom surface 117 and an opening 119 cut through the top surface 115 and the bottom surface 117. The clamping device 13 is connected to the bottom panel 111 of the vessel body 11 and clamped on the top surface 115 and bottom surface 117 of the bottom panel 111 of the vessel body. The stirrer device 15 comprises a stirrer housing 151 and a stirrer assembly 152. The stirrer housing 151 comprises a head and a body. The head is upward and outward expanded from the body. The stirrer assembly 152 is inserted through the stirrer housing 151. The stirrer housing 151 is inserted through the opening 119 of the bottom panel 111 of the vessel body 11 and connected to the clamping device 13. Thus, the bottom panel 111 of the vessel body 11 is clamped by the clamping device 13, and tightly connected and secured by the stirrer housing 151 and the clamping device 13, and therefore, after a long use of the mixing vessel 11, the clamping device 13 stops water leaks due to deformation of the bottom panel 111. The shockproof gasket 139 is mounted between the bottom block 131 and the bottom panel 111 of the vessel body 11 to reduce generation of vessel body vibration during rotation of the stirrer assembly 152.

The screw nuts 141 and the screws 143 are installed to connect the bottom block 133 and the vessel body 11, affixing the bottom block 133 to the vessel body 11 and avoiding loosening of the bottom block 133. In this embodiment, the fasteners are composed of screw nuts 141 and screws 143, however, in actual application, other types of fasteners can be used as substitutes, i.e., the fasteners are not limited to the composition of screw nuts 141 and screws 143.

It can be seen from FIG. 4 and FIG. 5, the arrangement of the vessel body 11, the clamping device 13 and the stirrer housing 151 exhibits the same configuration when viewed in different sectional directions, the follow-up enlarged view of a part of FIG. 4 (i.e., FIG. 6) further illustrates the relationship between the vessel body 11, the clamping device 13 and the stirrer housing 151.

Figure 6:
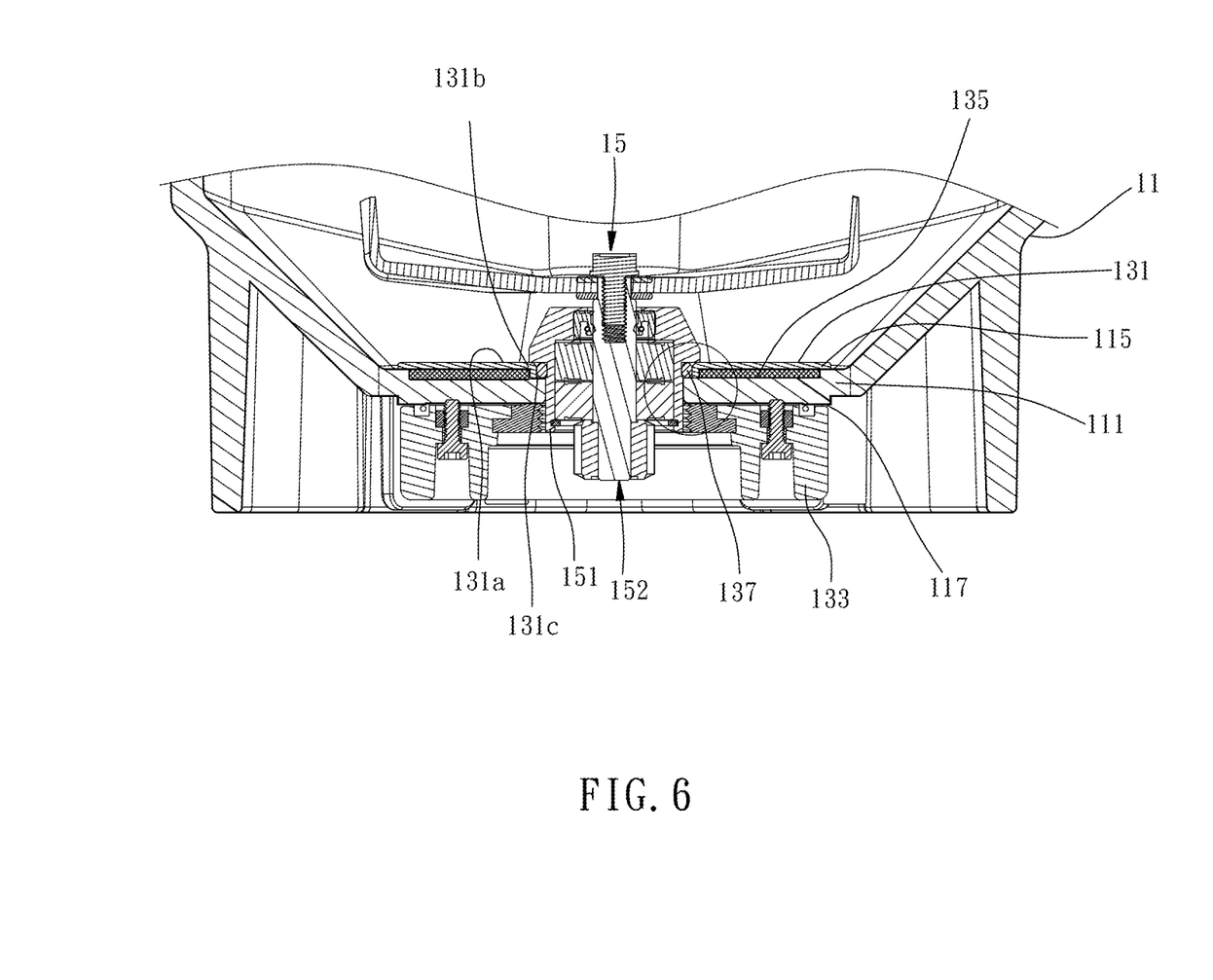
FIG. 6 is an enlarged view of a part of FIG. 4.
Figure 7:
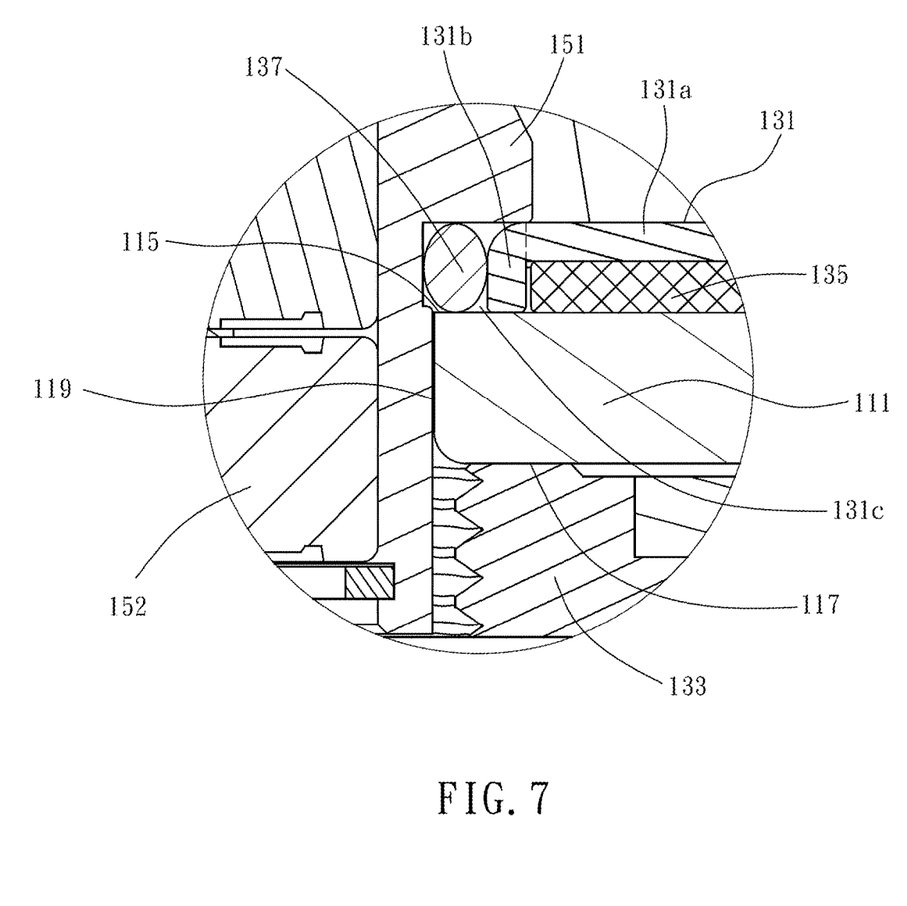
FIG. 7 is an enlarged view of a part of FIG. 6.

As illustrated in FIG. 6 and FIG. 7, the pressure plate 131 is stopped against the top surface 115 of the bottom panel 111 of the vessel body 11; the bottom block 133 supports the bottom surface 117 of bottom panel 111 of the vessel body 11; the body of the stirrer housing 151 is connected to the bottom block 133 and clamped on the pressure plate 131. The head upon the top surface of the pressure plate 131. The head of the stirrer housing 151 is pushed by the pressure plate 131 to contact the bottom panel 111 of the vessel body 11. The body of the stirrer housing 151 is connected to the bottom block 133 and supported the bottom panel 111 of the vessel body 11. Thus, the head of the stirrer housing 15 enables the pressure plate 131 and the bottom block 133 to be clamped on and firmly secured to the bottom panel 111 of the vessel body 11.

The waterproof gasket 135 is tightly squeezed between the pressure plate 131 and the bottom panel 111 of the vessel body 11 to prevent leaking of fluid out of the vessel body 11.

The pressure plate 131 comprises a circular flat board 131a and a extend wall 131b. The top surface is provided on the circular flat board 131a. The circular flat board 131a has a through hole 131c (see FIG. 2, FIG. 6 and FIG. 7). The through hole 131c is disposed in communication with the opening 119 of the bottom panel 111 of the vessel body 11. The extend wall 131b extends downwardly from the circular flat board 131a around the through hole 131c. The stirrer housing 151 is inserted through the through hole 131c, and clamped on a top edge of the extend wall 131b. The extend wall 131b has an opposing bottom edge thereof abutted against the bottom panel 111 of the vessel body 11. The waterproof gasket 135 is set between the circular flat board 131a of the pressure plate 131 and the bottom panel 115 of the extend wall 131b.

The water seal ring 137 is mounted between the pressure plate 131 of the clamping device 13 and the stirrer housing 151 to stop leaking of fluid out of the vessel body 11 through the surface of the stirrer housing 151.

Thus, the clamping device 13 of the invention not only can prevent the bottom panel 111 from deformation by means of clamping the pressure plate 131 and the bottom block 133 on the bottom panel 111 of the vessel body 11 but also can prohibit leaking of fluid out of the vessel body 11 by means of the water seal ring 137.

Although the clamping device in this embodiment consists of the aforesaid various components, in actual application, the clamping device can be made in any of a variety of other alternate forms that are capable of securing the bottom panel of the vessel body to prevent the bottom panel of the vessel body from deformation, and therefore, the clamping device is not limited to the design in the aforesaid embodiment. Further, in the aforesaid description of the related art, it is indicated that the mixing vessel of a food processor can easily be becoming deformed after a long use, however, the bottom of the vessel body of a juicer or blender can also be becoming deformed after a long use. Thus, the application of the mixing vessel of the present invention should not be limited to food processor.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A mixing vessel, comprising:
 a vessel body comprising a bottom panel and a vessel wall upwardly extended from a border of said bottom panel, said bottom panel comprising a top surface, an opposing bottom surface and an opening cut through said top surface and said bottom surface;
 a clamping device connected to said bottom panel of said vessel body and clamped on said top surface and said bottom surface of said bottom panel;
 a stirrer housing comprising a head and a body, said head being upward and outward expanded from said body, said body inserted through said opening of said bottom panel of said vessel body; and
 a stirrer assembly inserted through said stirrer housing; wherein said clamping device comprises a metal pressure plate and a bottom block, said metal pressure plate is contacted and located at said top surface of said bottom panel of said vessel body, a top surface of said metal pressure plate is an entire flat surface, said head is abutted upon said top surface of said metal pressure plate, said bottom block is located at said bottom surface of said bottom panel of said vessel body; said head of said stirrer housing is configured to push said metal pressure plate to contact said bottom panel of said vessel body, said body of said stirrer housing is connected to said bottom block and supports said bottom panel of said vessel body.

2. The mixing vessel as claimed in claim 1, wherein said metal pressure plate is made of stainless steel.

3. The mixing vessel as claimed in claim 1, wherein said clamping device further comprises a plurality of fasteners adapted to secure said vessel body and said bottom block of said clamping device together.

4. The mixing vessel as claimed in claim 1, wherein said clamping device further comprises a waterproof gasket squeezed in between said metal pressure plate and said bottom panel of said vessel body.

5. The mixing vessel as claimed in claim 4, wherein said metal pressure plate comprises a circular flat board and a extend wall, said circular flat board comprising a through hole disposed in communication with said opening of said bottom panel of said vessel body, said extend wall extending downwardly from said circular flat board around said through hole, said extend wall having a top edge and an opposing bottom edge, said bottom edge of said extend wall being abutted against said bottom panel of said vessel body, said top surface is provided on said circular flat board.

6. The mixing vessel as claimed in claim 5, wherein said clamping device further comprises a water seal ring mounted between said extend wall of said metal pressure plate of said clamping device and said body of said stirrer housing.

7. The mixing vessel as claimed in claim 1, wherein said clamping device further comprises a water seal ring mounted between said metal pressure plate of said clamping device and said body of said stirrer housing.

8. The mixing vessel as claimed in claim 1, wherein an outer contour of said vessel body exhibits a rhombic shape, a contour of said bottom panel of said vessel body exhibits a rhombic shape.

9. The mixing vessel as claimed in claim 1, wherein said clamping device further comprises a shockproof gasket mounted between said bottom block and said bottom panel of said vessel body.

\* \* \* \* \*